Patented June 4, 1946

2,401,658

UNITED STATES PATENT OFFICE 2,401,658

CHEMICALS

Philip T. Paul, Naugatuck, Conn., assignor to United States Rubber Company, New York, N. Y., a corporation of New Jersey No Drawing. Application January 13, 1943, Serial No. 472,272

1 Claim. (Cl. 260—573)

This invention relates to a new class of chemical compounds called hydroxyl-alkyl substituted N,N'-diaryl arylene diamines, and more particularly those of the general formula $$R-N'-R'-N-R$$
with H and A substituents where R represents an aromatic group such as phenyl, naphthyl, etc., which may contain further substituents; R' is an arylene nucleus; and A represents a hydroxy alkyl group having at least two carbon atoms in the chain.

This application is a continuation-in-part of my application Serial No. 374,478, filed January 15, 1941.

The mono-hydroxyl alkyl substituted chemicals may be synthesized, for example, from (a) diarylamines by first reacting the same with alkylene oxides, and then subsequently and successively nitrosating, reducing, acetylating, condensing with iodobenzene (or a corresponding homolog or analog), and hydrolyzing to the mono-hydroxy alkylated material, or (b) the mono- as well as the di-hydroxyl alkyl substituted chemicals may be prepared in somewhat less purified form by reacting a diaryl arylene diamine with an alkylene oxide ($C_nH_{2n}O$), enabling the carbon chain of the alkylene group to be linked in the final compound to an original secondary amino nitrogen atom besides having the said carbon chain linked to a hydroxy group. The nitrogen atom and the hydroxy group are joined to discrete carbon atoms.

The mechanics of the (a) reaction is illustrated as follows in the preparation of mono N-(b-hydroxy ethyl) N,N'-diphenyl p-phenylene diamine. A symmetrical diaryl amine is heated with an alkylene oxide to form an N-hydroxy alkyl diaryl amine. This product is then nitrosated to form the para nitroso body (Cloez, Comptes Rendus 124, 893) which can be reduced to the amine by treatment with excess stannous chloride. The acetyl derivative of the amine may be condensed with iodobenzene (Wieland, Ber. 41, 3493) and the resulting acetyl derivative hydrolyzed with alcoholic potassium hydroxide. The scheme of the reaction is as follows:

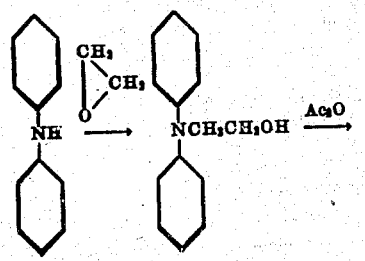

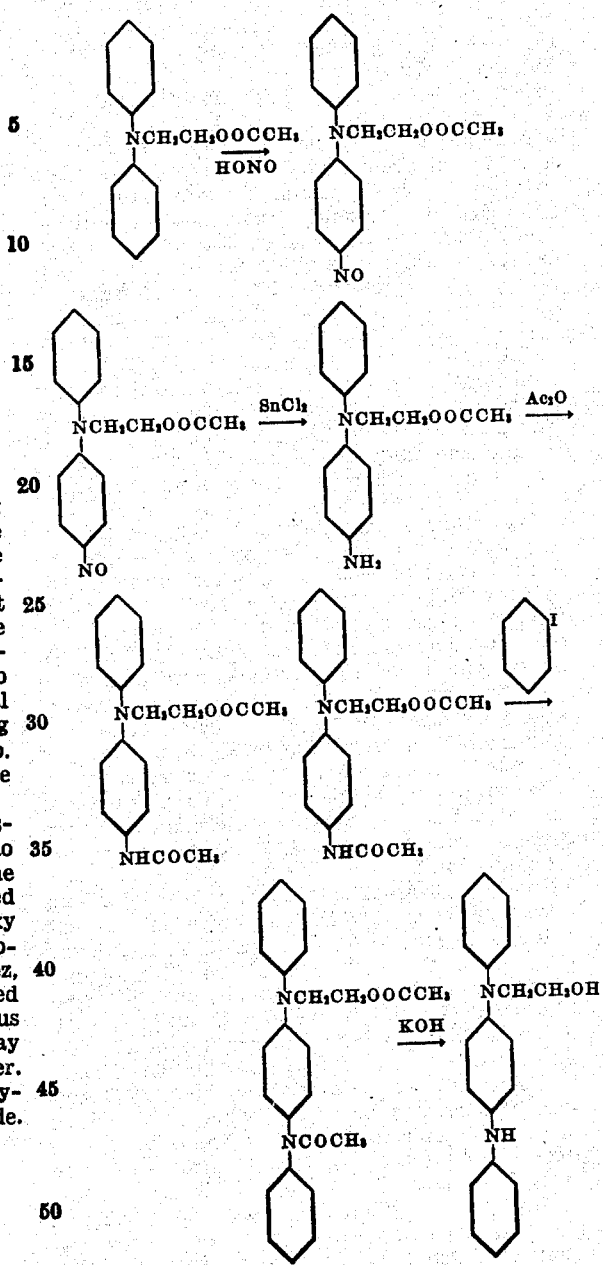

In the event that a diaryl amine having both para positions blocked is used as a starting material, the nitrosation will form an ortho nitroso substituted amine which will ultimately lead to an ortho phenylene diamine derivative.

In the (b) reaction, a diaryl arylene diamine and an alkylene oxide is reacted by passing the alkylene oxide into a solution of a diaryl arylene diamine in an inert solvent, e. g., dioxane, benzene, etc., or into the molten diaryl arylene diamine. In general, it is necessary to effect this reaction at elevated temperatures of which a range of about 100° C. to about 200° C. is the preferred range. The reaction may be carried out by slowly passing the alkylene oxide into the heated diamine under atmospheric or under super atmospheric pressures. It is desirable that the diamine be stirred so as to continually expose fresh surface for hydroxy alkylation and to minimize the formation of N,N'-disubstituted material. The composition of the final product is controlled by the amount of the alkylene oxide reacted. To prepare a product which consists substantially of the mono-hydroxy alkylated material (as distinguished from the di-hydroxy alkylated material), between 1 and 2 mols of the oxide, more specifically 1¼ mols of the alkylene oxide, are reacted with 1 mol of the diamine. To prepare a di-hydroxy alkylated material, at least 2 and preferably 3 or 4 mols of alkylene oxide per mol of the diamine are employed in the reaction. In general, to prepare the di-hydroxy alkylated derivatives, the preferred procedure is to use a large excess of oxide and to repeat the hydroxy alkylation, if necessary. It may be difficult to isolate the mono-hydroxy alkylated body since, being an unsymmetrical material, it is low melting and usually a viscous liquid but, in general, a product consisting of a preponderant proportion of mono-hydroxy alkylated material may be prepared by passing in an alkylene oxide to the diaryl arylene diamine until the unreacted diamine content drops to a low level, such as 10% or less.

It is relatively easy to separate unreacted oxide since this material is very volatile and the unreacted diamine can be substantially separated by extracting the crude product with an organic solvent such as alcohol or benzene in which the diaryl arylene diamine is relatively insoluble. To isolate the mono-hydroxy alkylated derivative may be more difficult, as referred to above, as this class of materials is characterized as low melting oils quite soluble in the usual organic solvents. The di-hydroxy alkylated material however can be isolated by a series of fractional crystallizations since these materials tend to be more crystallized than the mono-hydroxy alkylated bodies.

In the (b) reaction a catalyst usually is not necessary, especially in working with ethylene oxide, propylene oxide, or oxides of four-member rings. However, in the use of the 1,2-oxide of a highly branched carbon chain (isobutylene oxide) the reactivity is low and a catalyst accelerates the reaction. A number of materials serve as catalysts of which the halogens, their acids and salts are particularly advantageous. Examples of such are bromine, iodine, hydrochloric acid, hydroiodic acid, ferrous chloride, ferrous iodide, aluminum chloride, sulfuric acid, and phosphoric acid.

Any residual acidity that may be associated with the products may be removed by neutralization with alkali in any known manner. Also, as is known in this art, suitable equipment is used to protect against any corrosion that may be due to the acidic influence of the catalysts.

The following examples are given to further illustrate the invention:

EXAMPLE 1.—PREPARATION OF N-(B-HYDROXY ETHYL) N,N'-DIPHENYL P-PHENATE DIAMINE

*Preparation of N-(b-hydroxy ethyl)diphenylamine*

A mixture of 33.8 gr. diphenylamine and 8.8 gr. ethylene oxide was heated 15 hours at 240–250° C. in a sealed tube. The tube was cooled, opened and the product cleaned up by a vacuum distillation. The product, a yellow oil, distilled 155–160° C. at 1–2 mm. mercury pressure. The yield is better than 90%.

*Acetylation of N-(b-hydroxy ethyl) diphenylamine*

A solution of 107 gr. N-(b-hydroxy ethyl) diphenylamine in 56 grams acetic anhydride was refluxed (140° C.) one hour, cooled and poured into water. The water slurry was neutralized with sodium hydroxide, extracted with ether and the ether solution washed until neutral, dried over sodium sulfate, evaporated and distilled. Oil, B. R. 140–145° C. at 1–2 mm. Yield 116 gr.

*Nitrosation of N-(b-acetoxy ethyl) diphenylamine*

A suspension of 79 gr. N-(b-acetoxy ethyl) diphenylamine in 250 cc. alcohol and 65 cc. concentrated hydrochloric acid was stirred and cooled to +5° C. With stirring a solution of 17.3 gr. sodium nitrite in 75 cc. water was added over a 30 minute period. The solution became dark brown during the addition of the nitrite. It was allowed to stand in an ice bath for an additional 30 minutes.

*Reduction of N-(b-acetoxy ethyl) 4-nitroso diphenylamine*

To a solution of 169 gr. stannous chloride dihydrate in 125 cc. concentrated hydrochloric acid heated and stirred on a steam bath, the above alcoholic solution of the nitroso body was rapidly added. The color disappears almost immediately. The mixture after heating 15–30 minutes was cooled, aqueous sodium hydroxide sufficient to neutralize and form soluble sodium stannite was added, and the solution filtered through plugs of glass wool until essentially clear. The clarified solution was extracted with benzene, the benzene extract washed, dried, evaporated and vacuum distilled. Yield 50 grams of a yellow oil, B. R. 170–205° C. at 1 mm.

The acid reduction apparently caused some hydrolysis of the acetyl group as an odor of ethyl acetate was apparent at the end. However, this hydrolysis is not important since the acetyl group was immediately reintroduced in the next step.

*N-(b-acetoxy ethyl) 4-acetylamine diphenylamine*

The above distillate (B. R. 170–205° C. at 1 mm.) (50 gr.), 40 cc. acetic acid and 50 cc. acetic anhydride were mixed and allowed to stand for forty five minutes. Heat was evolved. The solution was cooled, diluted and neutralized. On standing, the acetyl derivative crystallized out. Yield 32.5 gr.

*N-(b-acetoxy ethyl) N'-acetyl N,N'-diphenyl p-phenylene diamine*

A mixture of

N-(b-acetoxy ethyl) 4-acetamino diphenylamine _____ gr__ 32.5
Iodobenzene _____ gr__ 21.2

| | | |
|---|---|---|
| K₂CO₃ (anhy) | gr | 19.4 |
| Copper powder | gr | 1/2 |
| Methyl hexyl carbinol | cc | 100 | was refluxed and stirred 25 hours. The mixture was cooled and the carbinol removed by steam distillation after which the non-volatile portion was extracted with benzene. The benzene extract was filtered, washed and evaporated. Alcohol was added and the evaporation repeated.

*N-(b-hydroxy ethyl) N,N'-diphenyl p-phenylene diamine*

To the residue from the alcohol evaporation, 10 gr. sodium hydroxide dissolved in 10 cc. water and 50 cc. alcohol was added and the solution refluxed 5 hours, cooled, diluted and extracted with benzene.

The benzene solution was washed, evaporated, and the residue fractionated.

| Fraction | Boiling range |
|---|---|
| I | 186–242° C. at 4 mm. |
| II | 240–260° C. at 4 mm. |
| III | 270–280° C. at 4 mm. |

Fraction II is N-(b-hydroxy ethyl) N, N'-diphenyl p-phenylene diamine.

EXAMPLE 2.—PREPARATION OF N-(B-HYDROXY ETHYL) N,N'-DIPENYL P-PHENYLENE DIAMINE FROM ETHYLENE OXIDE AND DIPHENYL P-PHENYLENE DIAMINE

In a 5 gallon steel autoclave equipped with a stirrer, 22 pounds, 14 ounces (1 mol) of technical diphenyl p-phenylene diamine was heated to 175° C. Over an 8 hour period, 4 pounds, 10 ounces (1.24 mol) of ethylene oxide was passed in. Heating and stirring were continued 1 hour and the contents discharged. The product is a heavy viscous material consisting substantially of N-(b-hydroxy ethyl) N,N'-diphenyl p-phenylene diamine.

EXAMPLE 3

Ethylene oxide (6 cc.) was condensed in a test tube in an acetone-dry ice bath and the tube closed so as to effect a thin seal. N,N'-diphenyl p-phenylene diamine (26 grams) was placed in a Carius tube along with a small piece of steel and the tube of ethylene oxide. After the Carius tube had been sealed it was shaken until the steel broke the test tube containing the ethylene oxide. The contents were then heated overnight at 175° C. and the product was purified by dissolving in acetone, filtering and removing the solvent by vacuum distillation. The product, a thick oil, analyzed 8.64 percent nitrogen and consisted of a mixture of N-(b-hydroxy ethyl) N,N'-diphenyl p-phenylene diamine and N,N' di-(b-hydroxy ethyl) N,N'-diphenyl p-phenylene diamine.

EXAMPLE 4

Diphenyl p-phenylene diamine (20 grams) and 12 grams of isobutylene oxide were autoclaved 75 hours at 200° C. The product on vacuum distillation gave two fractions: fraction I—boiling range 225–250° C. at 3 mm. consisting of unreacted diphenyl p-phenylene diamine and fraction II—boiling range 260–265° C. at 3 mm. The latter consists substantially of N,(b-hydroxy isobutyl N,N'-diphenyl p-phenylene diamine. It analyzed 8.8 percent nitrogen.

EXAMPLE 5

Diphenyl p-phenylene diamine (26 grams) was autoclaved overnight at 200° C. with 5.8 grams propylene oxide and 0.1 gram of iodine as catalyst. The product was dissolved in benzene and the solution washed with dilute sodium hydroxide. On vacuum distillation a thick red oil—boiling range 250–275° C. at 5 mm. was obtained.

Further examples of aliphatic oxides which may be reacted with any of the diamines are the following:

n-Butylene oxide
n-Amylene oxide
Iso amylene oxide
Trimethylene oxide
Tetra methylene oxide
Penta methylene oxide Other examples of N,N'-diaryl arylene diamines that could be used for reacting with any of the aliphatic oxides are the following:

Diphenyl meta-phenylene diamine
Diphenyl ortho-phenylene diamine
Ditolyl p-phenylene diamine
Di-p-anisyl p-phenylene diamine
Di-alpha naphthyl p-phenylene diamine
Di-beta naphthyl p-phenylene diamine
Di-p-xenyl p-phenylene diamine
Di-p-chlorophenyl p-phenylene diamine
Di-p-phenoxy diphenyl p-phenylene diamine
Di(p-ethyl diphenyl) p-phenylene diamine
Diphenyl p-tolylene diamine
Diphenyl o-tolylene diamine
4-allyl 4'anilino diphenylamine
4-isopropenyl 4' anilino diphenylamine
Diphenyl 1-4 naphthalene diamine
Di-p-hydroxy phenyl p-phenylene diamine The chemicals are useful as intermediates for the preparation of chemicals, as insecticides, as preservatives for rubber, gasolines, oils, soaps, unsaturated polymeric olefins, as anti-rust agents, etc.

Having thus described my invention, what I claim and desire to protect by Letters Patent is:

A compound having the general formula

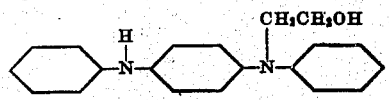

PHILIP T. PAUL.